United States Patent [19]
Haberkorn

[11] 3,730,458
[45] May 1, 1973

[54] JET-CONTROLLED AIRCRAFT WITH TRIM AND CONTROL FINS

[75] Inventor: Erich J. Haberkorn, Riemerling, Germany

[73] Assignee: Messerschmitt-Bölkow-Blohm GmbH, Munich, Postfach, Germany

[22] Filed: Oct. 15, 1970

[21] Appl. No.: 81,033

[52] U.S. Cl. .................................... 244/43, 244/47
[51] Int. Cl. ............................................. B64c 9/34
[58] Field of Search ................. 244/43, 49, 41, 40, 244/46, 35, 89, 87, 88, 42 R, 42 D, 47

[56] References Cited

UNITED STATES PATENTS

| | | | |
|---|---|---|---|
| 2,601,962 | 7/1952 | Douglas | 244/89 X |
| 2,941,752 | 6/1960 | Gluhareff | 244/46 |
| 3,104,079 | 9/1963 | Phillips | 244/43 X |
| 2,430,793 | 11/1947 | Wells | 244/87 |
| 2,693,325 | 11/1954 | Lippisch | 244/87 |

FOREIGN PATENTS OR APPLICATIONS

| | | | |
|---|---|---|---|
| 1,083,557 | 1/1955 | France | 244/46 |

*Primary Examiner*—Milton Buchler
*Assistant Examiner*—Carl A. Rutledge
*Attorney*—Woodhams, Blanchard and Flynn

[57] ABSTRACT

Control means for jet aircraft. In jet aircraft where the thrust jet is directly utilized for producing control moments, control fins are provided on the fuselage which are extended during takeoff and landings and also to some extent during subsonic flight but which are folded into the fuselage during normal flight. When so retracted, said stabilizing fins are received into suitable recesses in the fuselage to blend smoothly therewith.

2 Claims, 3 Drawing Figures

FIG. 1
FIG. 2   FIG. 3
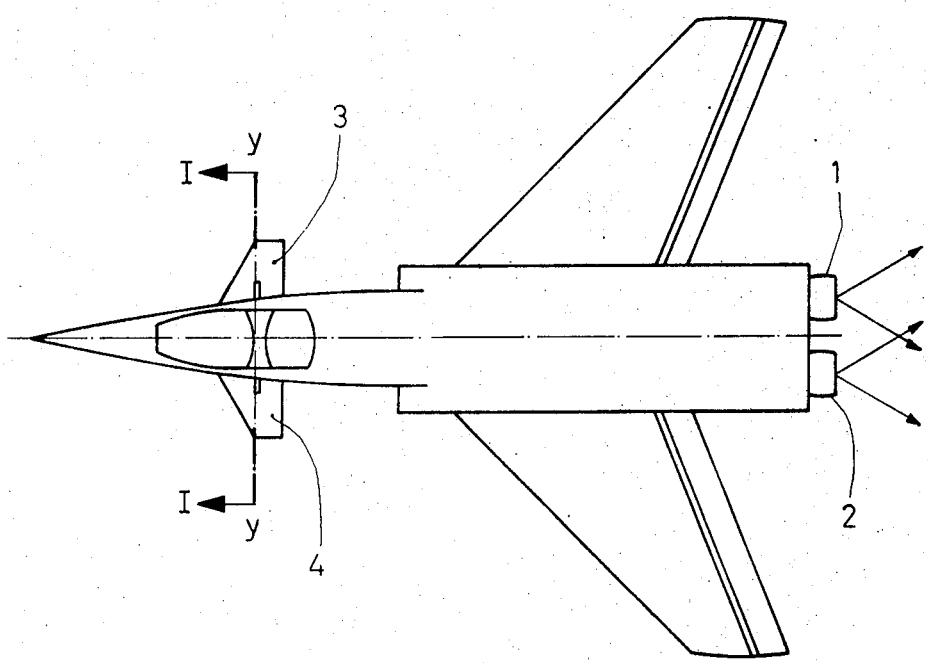
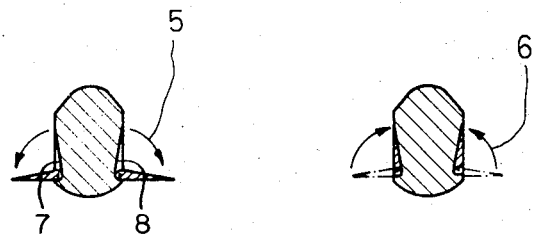
INVENTOR
ERICH J. HABERKORN
BY
Woodhams, Blanchard and Flynn
ATTORNEYS

JET-CONTROLLED AIRCRAFT WITH TRIM AND CONTROL FINS

The invention relates to a jet-controlled flight vehicle, particularly a jet-controlled combat aircraft provided with control or trim fins as stabilizing aids.

In order to save weight and to reduce drag, the thrust jet is directly utilized for producing control moments. In STOL and Ultra-STOL aircraft the free horizontal tail area can amount to 40 percent and more, and the vertical tail area to about 25 percent of the free wing area. Thus, the elimination of the tail areas results in a relatively great improvement as far as drag and weight are concerned, which means, above all, a greater range.

In this connection, it is already known to deflect the thrust jet by means of a nozzle which may be swivelled in any direction like a ball joint. An earlier proposal of the applicant, which has not been made known, provides that the overlapping wall parts of the ball nozzle and the jet pipe be provided with partially overlapping openings in the direction of the aircraft yaw and pitch axes so that swivelling the nozzle opens a larger cross section in the swivelling direction and a smaller one in the opposite direction. The result is an additional control moment, which considerably improves the controllability of the aircraft.

In addition, German Patent Specification 1,087,005 and U. S. Pat. No. 2,693,325 have disclosed the arrangement of secondary control surfaces in addition to the actual wings, as is the case with an aircraft having a canard or tail-first horizontal stabilizer. Such secondary control surfaces can also improve the controllability of a jet-controlled aircraft and stabilize the flight.

Assuming a jet-controlled aircraft with one or more engines and control or trim fins arranged in the cockpit area, the object of the invention is to reduce again the air resistance for the normal flight condition, particularly for long-distance flight in order to achieve a corresponding increase in range. The objective of the invention has been solved by having control or trim fins which may be folded so as to be flush with the skin of the fuselage. Thus, the fins form an aerodynamically clean surface with the outer contour of the fuselage so that, during normal flight conditions, the aerodynamics of the aircraft in question are not adversely influenced by control elements. This leads to a considerable improvement in the range of a jet-controlled aircraft.

When the control or trim fins are extended, i.e., mainly during takeoff and landing approach and also to some extent in the subsonic region, they provide a number of advantages: They increase stability according to the requirements; rotation about the y-axis by means of actuators serves for controlling and trimming; they may be utilized for increasing the payload; and they reduce the takeoff and landing distances.

Furthermore, it is advantageous within the framework of the invention, when the control or trim fins may be fixed in any intermediate positions between their spread and folded positions, which allows stability corrections to be performed. In this connection, it is also useful when the control or trim fins may, in any known way, be moved and fixed independently of each other.

The figures illustrate the invention;

FIG. 1 shows a top view of a jet-controlled aircraft with the stabilizing fins.

FIGS. 2 and 3 depict cross sections through plane y, showing the fins in the spread and folded positions.

The aircraft according to FIG. 1 is equipped with two so-called ball nozzles 1 and 2 which produce any desired control moments by swivelling in various directions. The multiple engine arrangement provides the advantage that, in addition to pitching and yawing, roll moments may easily be adjusted by swivelling the engines in opposite directions. According to the invention, the aircraft has, as shown in FIG. 1, two symmetrical control or trim fins 3 and 4. As can be seen from the figures, these fins 2 and 3 may be pivoted, which is indicated by the arrows 5 and 6 about an axis adjacent a longitudinal edge of the fins into and out of pockets 7 and 8 on opposite sides of the pilots cabin as illustrated in FIGS. 2 and 3. They may be fixed in any intermediate position between the two extreme positions. When folded, the flaps 3 and 4 exactly fit into the outer contour of the aircraft fuselage.

The stabilizing fins are actuated, in a known way, by means of ball joint bearings and an actuator, the function of which is basically known and for this reason need not be illustrated here. Finally, a considerable advantage of the fins 3 and 4 according to the invention is provided by having them pivot about the y-axis in order to produce additional lift forces in specific flight conditions.

The embodiments of the invention in which an exclusive property or privilege is claimed are defined as follows:

1. In an aircraft having a fuselage and a pilot's cabin and at least one propulsion engine, the improvement comprising:

trim control fin means including a pair of trim fins and means pivotally mounting same on said fuselage adjacent on opposite sides of said pilot's cabin and about an axis adjacent and coextensive with a longitudinal edge of each said trim fin, a surface of each said fin having a contour which conforms to the surface of said fuselage adjacent said pilot's cabin;

means defining a pocket-like recess in said aircraft fuselage adjacent each said trim fin and adapted to receive said trim fin therein, said recess being of a sufficient depth that said surface of said fin will be flush with said surface of said fuselage to thereby eliminate drag resistance when said fin is housed within said recess;

adjusting means for adjusting said fin means in any intermediate position between the folded and spread positions, said adjusting means including means for adjusting said fins independently of each other; and control means for pivoting said fins about the y-axis of the aircraft, said y-axis being perpendicular to the longitudinal axis of the aircraft.

2. The improvement according to claim 1, wherein the trim control fin means are pivotally connected to said fuselage adjacent the lower portion thereof and are pivotally swingable toward the upper portion of said fuselage when being moved from said spread position toward said folded position wherein the trim control fin means are disposed in said recesses.

* * * * *